March 8, 1966

O. SCHWAB 3,238,817

TRANSMISSION FOR MOTOR VEHICLES, PARTICULARLY
TRACK TYPE VEHICLES

Filed Dec. 6, 1962

Inventor

OTTO SCHWAB

By Albert M Zalkind

Attorney

United States Patent Office 3,238,817
Patented Mar. 8, 1966

3,238,817
TRANSMISSION FOR MOTOR VEHICLES, PARTICULARLY TRACK TYPE VEHICLES
Otto Schwab, Friedrichshafen, Germany, assignor to Zahnradfabrik Friedrichshafen, Aktiengesellschaft, Friedrichshafen, Germany
Filed Dec. 6, 1962, Ser. No. 242,843
Claims priority, application Germany, Dec. 8, 1961, Z 9,127
9 Claims. (Cl. 74—754)

This invention relates to gear shift transmissions, and more especially to a transmission which can be shifted under full load.

It is a particular object of the invention to provide a transmission having such cooling characteristics as to achieve a full load shifting, and wherein the parts which would normally generate heat are so dimensioned that no greater quantity of heat than 0.005 K cal./cm.$^2$ will be generated on the various brakes and clutches used to control the shift of gear speeds.

It is another object of the invention to provide a gear transmission capable of exerting high torque but it will be smooth in transition between speeds.

It is a still further object of the invention to provide a transmission having forward and reverse speeds wherein each forward speed has a corresponding rear speed.

Briefly, the invention combines a plurality of planetary gear devices which may be driven by a torque converter and wherein a bypass or bridging clutch is utilized in conjunction with the torque converter. Normally the bridging clutch transmits direct torque from an input shaft to the gearing. However, when changing or shifting speeds, which is accomplished by means of clutches and/or brakes, the bridging clutch is automatically disengaged so that torque is transmitted through the torque converter. This provides for smooth shifting transition. Different means may be used for effecting automatic engagement and disengagement of the bridging clutch, one such means being a delay operated valve and another such means being an electrical relay having a predetermined holding characteristic in point of time. Further, the construction of the invention is such that the frictional engaging parts are constantly bathed in oil which serves not only to lubricate the moving components, but also as a coolant to convey heat away. A particular feature of the cooling arrangement resides in the use of frictional disc packages for brakes, serving as torque reaction elements, in connection with the planetary gear devices, which packages are encompassed by rings having peripheral oil carrying channels. Such rings are internally splined so as to form a part of each respective brake wherein certain of the discs engage the splines of the respective rings to effect good heat transmitting connection.

For control of speed shifting, an arrangement is advantageously used, as disclosed in a previously filed patent application of Walter Heinz, Serial No. 222,346, filed September 10, 1962, now Patent No. 3,180,174 and assigned to the present assignee.

A detailed description of the invention now follows, in conjunction with the appended drawing, in which.

Figure 1:
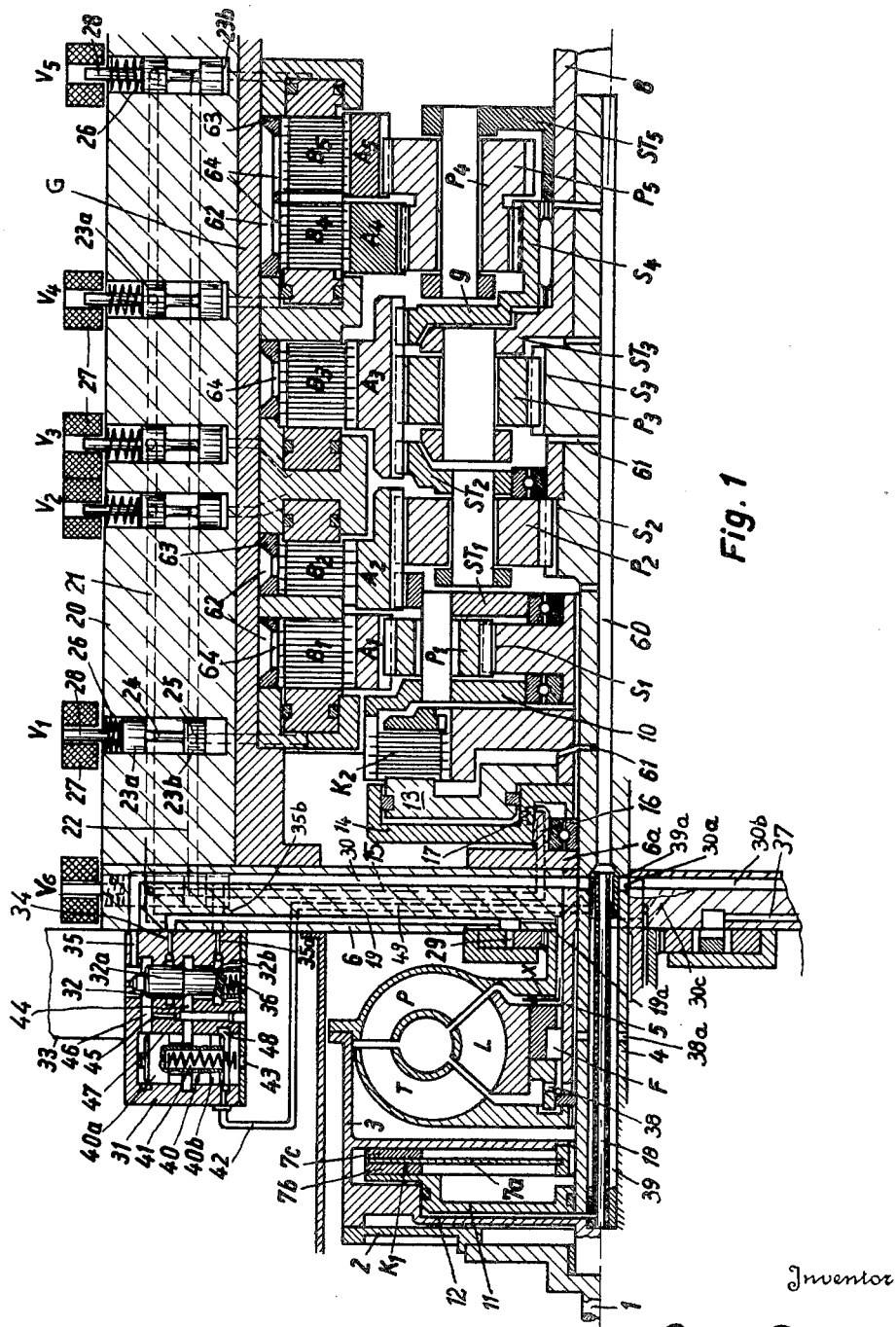
FIG. 1 is a cross sectional elevational fragmentary view of a transmission embodying the principles of the invention.

Referring now to FIG. 1, the invention comprises an input shaft 1 secured via a ring 2 with a drum 3 of a torque converter having impeller wheel P, the turbine wheel T and the guide vane wheel L. The turbine wheel is keyed to a tubular shaft 4 and the vane wheel is connected via a one-way coupling F to a hollow shaft 5, in accordance with conventional coupling practice, as used in torque converters, the shaft 5 being integrally secured to a housing closure disc 6, thus closing one end of the transmission housing G, which housing is carried within a valve box 20.

A bridging or bypass clutch $K_1$ is provided having a driven disc 7a slidably keyed to the shaft 4 for driving that shaft upon being frictionally engaged by the driving disc 7b. This causes disc 7a to engage frictional ring 7c integrally secured to a wall of drum 3, as shown. The frictional ring 7b is actuated into engagement by a pressure piston 11 to which it is secured enclosed by cylinder 12.

Under circumstances to be described, oil under pressure is fed to the left side of piston 11 to engage clutch $K_1$ or pressure is relieved to effect disengagement. In any event, it will be apparent that when clutch $K_1$ is engaged the impeller and turbine wheels of the torque converter are locked to each other by frictional engagement occurring in clutch $K_1$ and no converter action occurs. In effect, there is then direct drive between shafts 1 and 4.

The gear shifting devices comprise planetary gear arrangements, there being three such for forward speeds. Thus, the planetary gear devices are the sun wheels $S_1$, $S_2$ and $S_3$, the annular gears $A_1$, $A_2$ and $A_3$, the planet sets $P_1$, $P_2$ and $P_3$ carried on respective bridges $ST_1$, $ST_2$, and $ST_3$. Bridges $ST_1$ and $ST_2$ are provided with teeth that mesh respectively with the teeth of annular gears $A_2$ and $A_3$, while bridge $ST_3$ is integrally secured to the output drive shaft 8.

Two reverse speeds are provided via the sun gear $S_4$ which also serves as the sun gear for both reverse speeds in that it meshes with integral planet sets $P_4$ and $P_5$ via the planet set $P_4$. The planet sets are carried on the bridge $ST_5$ and mesh with individual respective annular gears $A_4$ and $A_5$. The sun wheel $S_4$ has an integral flange 9 provided with a toothed rim meshing with the annular gear $A_3$ to effect power for reverse drive from the forward speeds of the transmission. The bridge $ST_5$ is integrally secured to the output shaft 8.

The sun gears for forward speeds are all integral with the tubular shaft 4 and it will be noted that various oil passages 61 are provided radially through this shaft connecting with a central bore 60 through which bore oil is pumped from the pump 29 which is continually rotated via its connection to the impeller wheel of the turbine. It will thus be apparent that oil will be flung via centrifugal force into the planetary gear parts and also into respective brakes $B_1$, $B_2$, $B_3$, $B_4$ and $B_5$, comprised of conventional disc packages, but wherein intermediate plates are connected by slidable splining to respective surrounding rings 63 having peripheral oil channels 62 for retaining the oil as coolant in communication with the variable spacing between the brake discs through ports 64. Heat generated because of brake slippage during a ratio change is thereby effectively dissipated by the coolant as aforementioned to prevent development of heat in excess of 0.005 K cal./cm.$^2$ on the brake surfaces.

The transmission shaft 4 is integrally secured by slidable splining to the housing of a pressure piston 13 within cylinder 14 which can effect frictional engagement of the plates of a clutch $K_2$ to obtain a direct forward drive. Pressure can be exerted on piston 13 to compress the plates wherein intermediate plates are slidably keyed to a member 10 which is part of bridge $ST_1$ and other plates are slidably keyed to a flange rotatively secured to shaft 4. Accordingly, when clutch $K_2$ is engaged, torque is transmitted from shaft 4 to the bridge $ST_1$. Since the bridge $ST_1$ would be locked to shaft 4 upon engagement of clutch $K_2$ it will be apparent that the three forward speed planetary gear devices will rotate enbloc at that time. This is due to the fact that the bridge $ST_1$ meshes with the annular gear $A_2$ and will therefore cause the annular gear $A_2$ to rotate about the axis of shaft 4 as the bridge rotates about that axis. Similarly, the bridge $ST_2$, meshing with the annular gear $A_3$, will cause rotation in unison with annular gears $A_2$ and $A_1$ about the axes of shaft 4.

For first speed forward, the brake $B_3$ is engaged, thus holding annular gear $A_3$ against rotation whereby rotation of the sun gear will effect planeting of the planet set $P_3$ to drive bridge $ST_3$ and thus effect rotation of output shaft 8.

For second forward speed, the brake $B_2$ is engaged to stop rotation of annular gear $A_2$ whence planet set $P_2$ and its bridge $ST_2$ revolve around the axis of shaft 4 and since bridge $ST_2$ meshes with annular gear $A_3$, it drives $A_3$ to drive bridge $ST_3$ via pinion set $P_3$.

For third speed forward brake, $B_1$ is engaged to prevent rotation of annular gear $A_1$ and transmission of power is through sun wheel $S_1$ from shaft 4 to the planet set $P_1$ which then rotates with its bridge $ST_1$ around the axis of shaft 4. Torque is transmitted through bridge $ST_1$ to annular gear $A_2$ and thence through bridge $ST_2$ to annular gear $A_3$ and thence through bridge $ST_3$ to output shaft 8.

For first reverse speed, the brake $B_4$ is engaged, thus holding annular gear $A_4$ stationary. By virtue of the driving connection of the member 9 with the annular gear $A_3$, the sun gear $S_4$ is driven. Accordingly, closure of brake $B_4$ will effect rolling of the pinion set $P_4$ with respect to annular gear $A_4$ and thus bridge $ST_5$ is revolved to drive output shaft 8. In a similar manner, closure of brake $B_5$ will likewise drive output shaft 8 but at a different speed, due to the difference in pinion diameters of the pinion sets $P_4$ and $P_5$. In either case, only the single sun gear $S_4$ is required.

The brakes $B_1$ through $B_5$ and the clutch $K_2$ will be understood to be oil pressure operated via respective valves $V_1$, $V_2$, $V_3$, $V_4$, $V_5$ and $V_6$, the last valve being for operation of clutch $K_2$, supplying fluid through passages 15, 16 and port 17 to cylinder 14. The valves may be operated hydraulically, pneumatically or electromagnetically.

Figure 3:
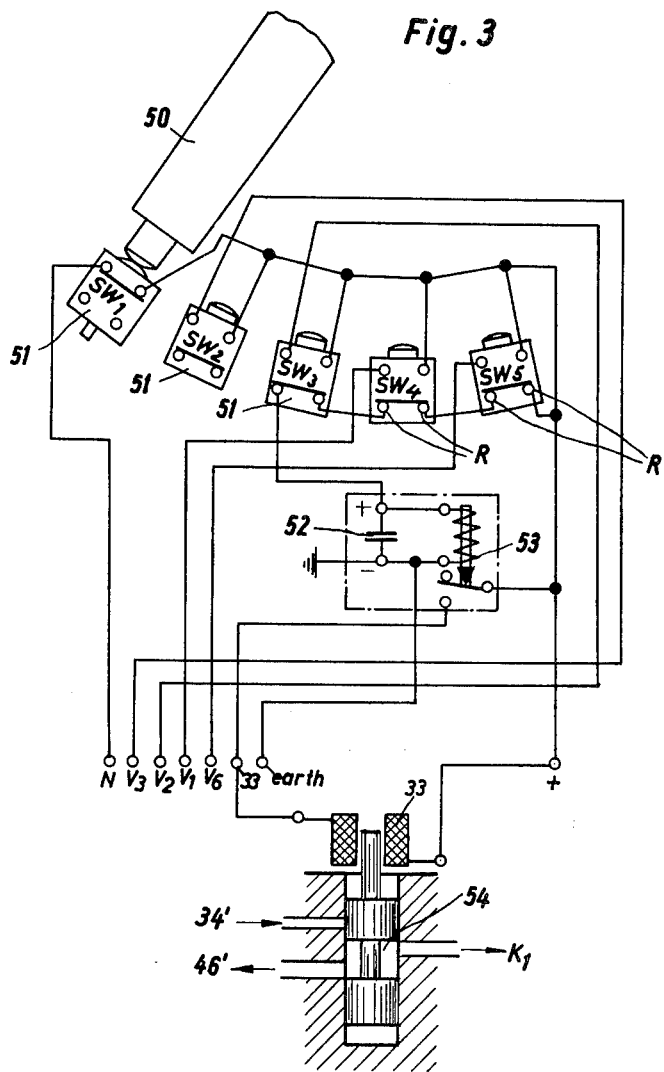
FIG. 3 is an electrical diagram showing another manner of effecting automatic control of the bridging clutch.

In FIG. 1, the valves are operated by means of solenoids 27 and comprise valve spools having valve sections 23a and 23b connected by a rod 24, in each case. All of the valves are carried in the valve box 20 and fed by a common pressure line 21, exhausting via a common exhaust line 22. Pressure in line 21 is provided by the pump 29 which will be understood to connect to the oil sump (not shown) of the transmission. The exhaust line 22 connects with an oil sump line 30 via annular recess 30a. In each instance, a passage 25 which can be blocked by valve sections 23b connects with respective pistons which effect engagement of the brake plates, for example, the piston Z. However, in each instance, a spring 26 biases the valve spools so that the space between the valve sections 23a and 23b communicate with exhaust line 22, as shown for all valves except $V_1$. Energization of any of the solenoids effects lifting of the respective valve spool to communicate pressure to the respective brake. It will be understood that a suitable electrical switch arrangement operated by a gear shift control lever can be utilized to control energization of the valve solenoids. For example, such an arrangement is shown in FIG. 3, to be later described in conjunction with a modification of the means for effecting disengagement of brake $K_1$ during speed transistion. Such switching arrangement is clearly and fully disclosed in the previously mentioned patent application (Ser. No. 222,346). In FIG. 1, however, the means for effecting disengagement of clutch $K_1$ when shifting from one speed to another, in order to provide smooth transistion and prevent jerking of the vehicle is accomplished by a delay action pilot valve 31 which permits torque transmission through the torque converter by the disengagement of clutch $K_1$.

In the box of the pilot valve 31 are arranged the two pistons 32 and 40. Over the piston 32 a solenoid 33 is arranged. As shown in FIG. 1, solenoid 33 is energized and this holds piston section 32a in position to block the inlet 34 for pressure oil of the line 19 against the compression of spring 36. When solenoid 33 is de-energized, spring 36 pushes piston 32 upwardly and permits connection of inlet 34 via channel 44 and throttle valve 47 and channel 45 to passage 46 in the cylinder over the piston section 40a. The throttle valve 47 effects slow rise of pressure on the piston section 40a until this is sufficient for pushing the piston section 40a against compression of spring 41. Accordingly, the piston section 40b will open channel 48. Now the piston section 40b permits connection of inlet 34 via channel 44—channel 48—line 42—channel 49 in the disc 6 to oil line 18 and out of this in the cylinder 12 for the piston 11, which operates the by-pass clutch $K_1$. When solenoid 33 is again energized and the piston section 32a blocks inlet 34 the space over piston section 40a will connect with the outlet 35 via channel 46 to sump line 30. Consequently, the piston 40 will push upwards without delay and the oil pressure in the line to $K_1$ will sink.

The pump 29 supplies oil to the impeller P via the pressure reducing line 19a and direction X. Through outlet 38 and the holes 38a the oil flows in the hole 39 of the shaft 4. Accordingly, the oil is still under pressure, this flows through the restrictor 39a in the hole 60 and through the passages for lubricating the gearing and cooling the clutch discs as said above.

In FIG. 3 the gear-shift lever 50 is shown in neutral position. When the arrangement is energized, the contact lever of the relay 53 is in the shown position since relay 53 is then energized and clutch $K_1$ is disengaged. In setting "first speed" by operating switch $SW_2$ the arrangement remains as before. When the lever 50 will be moved from position "first speed" to "second speed" the arrangement remains unchanged. Upon movement from first to second speed the lever 50 operates switch $SW_3$ and opens the corresponding contacts to R. Accordingly, the circuit of relay 53 is being interrupted. However, current from condenser 52 passes through relay 53 and keeps it attracted for some time. When condenser 52 is discharged, relay 53 is relieved and circuit 33 closes. Valve 54 is lifted so that pressure oil enters from 34' to clutch $K_1$ which closes so that the converter is bridged over and direct drive established during second speed operation. In the intermediate position of the lever 50 between first and second speed circuit of relay 53 will be closed and relay 53 attracts; circuit 33 is interrupted and valve 54 moves into its lower position where $K_1$ is released during the shift transistion. Similarly, release of $K_1$ occurs during transistion from second to third speed and from third to direct drive when lever 50 operates switches $SW_4$ and $SW_5$.

Figure 2:
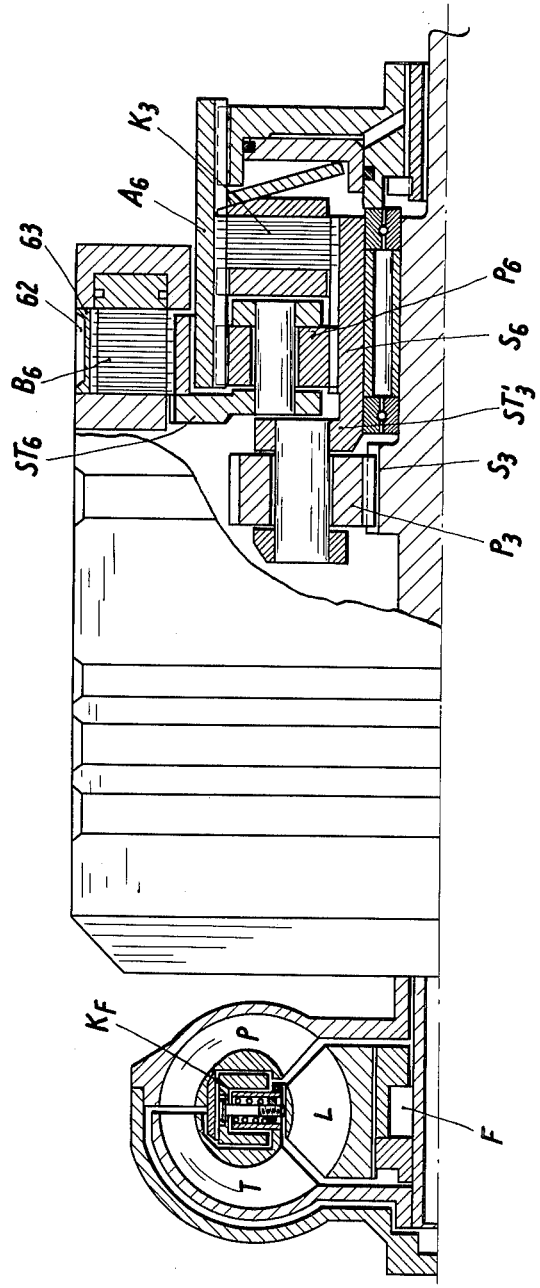
FIG. 2 is a modified version of the transmission showing the particular components which are modified.

Referring now to FIG. 2, a modification is disclosed wherein all forward speeds can be utilized for reverse travel. The reversing gear consists of a planetary device having the sun gear $S_6$, the annular gear $A_6$ and the planet set $P_6$ carried on the bridge $ST_6$. In this instance, a brake $B_6$ is used to stop rotation of bridge $ST_6$. The sun gear $S_6$ is integral with the bridge $ST_3'$, substituted for the bridge $ST_3$ of FIG. 1. The bridge $ST_3'$ is the carrier for the pinion set $P_3$ of FIG. 1 and the parts just described therefore act in conjunction with the remainder of the gear devices, clutches and brakes of FIG. 1, as heretofore described except for clutch $K_2$. A clutch $K_3$ instead is provided which when engaged will lock the planetary device $S_6$, $P_6$, $A_6$, to rotate en bloc and no effect is then had on direction of travel which is then forward, as controlled by the remainder of the transmission, it being noted that annular gear $A_6$ drives a radial flange R keyed thereto, which is the output of the transmission and can connect to an output shaft. However, for reverse travel, the brake $B_6$ is closed, which holds bridge $ST_6$ stationary, and thus the pinion set acts as an idler gear which reverses the direction of rotation of annular gear $A_6$, $K_3$ being released at that time.

Also, on FIG. 2 is shown a centrifugal clutch $K_F$ which is disposed inside the torque converter and may be of conventional construction. In such case, the torque converter operates only at low motor speeds.

What is claimed is:

1. In a transmission, a housing, an input shaft extending into the housing, an output shaft extending out of the housing, a plural speed drive unit rendered operative to drivingly connect the input shaft to the output shaft at a plurality of forward reduction drive ratios, a plurality of friction engaging devices operatively connected to said gear unit, having engaging surfaces, power operated means operatively connected to said friction engaging devices for engaging one of the friction engaging devices at a time to establish the respective forward drive ratios in the drive unit, means driven by the input shaft for supplying a flow of coolant to the housing, control means operatively connected to the power operated means for effecting engagement and disengagement of said friction engaging devices during transmission of power through the drive unit, and coolant retaining means carried by said housing maintaining said engaging surfaces of all of the friction engaging devices exposed to said coolant supplied to the housing for removal of heat generated during engagement and disengagement of the friction engaging devices.

2. The combination of claim 1 wherein said coolant retaining means includes a plurality of annular rings mounted on the housing and having radially outer channels therein and internal means formed on said annular rings for mounting said friction engaging devices and establishing fluid communication with said channels.

3. The combination of claim 2 wherein said friction engaging devices include friction discs bearing said engaging surfaces, said discs being splined to the annular rings and conducting coolant to and from the radially outer channels.

4. The combination of claim 3, wherein said drive unit includes a torque converter having an impeller connected to the input shaft and a turbine hydrodynamically driven by the impeller, multi-ratio gear means drivingly connecting said turbine to the output shaft, normally engaged clutch means connecting the input shaft to the gear means in by-pass relation to the torque converter, fluid operated means connected to the control means for abruptly disengaging said clutch means during engagement and disengagement of said friction engaging devices, and delay means operatively connected to said fluid operated means for delaying engagement of the clutch means upon establishment of a drive ratio through the gear means.

5. The combination of claim 4, wherein said multi-ratio gear means includes three planetary gear sets having input elements connected to the turbine of the torque converter, planet pinions enmeshed with said input elements, bridging elements rotatably mounting said planet pinions and reaction elements meshing with the planet pinions, the bridging elements of two of said gear sets being connected to the reaction elements of two other of said gear sets, the bridging element of another one of said gear sets being connected to the output shaft and each of said reaction elements of the gear sets being engageable by one of said friction engaging devices for braking thereof.

6. The combination of claim 5 including a two speed reverse drive unit drivingly connected to the output shaft.

7. The combination of claim 6 including electrical delay means operatively connected to the control means for delaying disengagement of said clutch means during engagement and disengagement of the friction engaging devices.

8. In a transmission, a housing, an input shaft extending into the housing, an output shaft extending out of the housing, a plural speed drive unit rendered operative to drivingly connect the input shaft to the output shaft at a plurality of forward reduction drive ratios, a plurality of friction engaging devices operatively connected to said gear unit having engaging surfaces, power operated means operatively connected to said friction engaging devices for engaging one of the friction engaging devices at a time to establish the respective forward drive ratios in the drive unit, means driven by the input shaft for supplying a flow of coolant to the housing, a plurality of annular rings mounted on the housing, each of said rings having a radially outer coolant retaining channel therein and internal means for mounting said friction engaging devices in fluid communication with said coolant retaining channel.

9. In a transmission, a housing, an input shaft extending into the housing, an output shaft extending out of the housing, a plural speed drive unit rendered operative to drivingly connect the input shaft to the output shaft at a plurality of forward reduction drive ratios, a plurality of friction engaging devices operatively connected to said gear unit having engaging surfaces, power operated means operatively connected to said friction engaging devices for engaging one of the friction engaging devices at a time to establish the respective forward drive ratios in the drive unit, control means operatively connected to the power operated means for effecting engagement and disengagement of said friction engaging devices, said drive unit including a torque converter having an impeller connected to the input shaft and a turbine hydrodynamically driven by the impeller, multi-ratio gear means drivingly connecting said turbine to the output shaft, normally engaged clutch means connecting the input shaft to the gear means in by-pass relation to the torque converter, fluid operated means connected to the control means for abruptly disengaging said clutch means during engagement and disengagement of said friction engaging devices, and delay means operatively connected to said fluid operated means for delaying engagement of the clutch means in response to establishment of a drive ratio through the gear means by the fluid operated means and electrical delay means operatively connected to the control means for delaying disengagement of said clutch means during a change in drive ratio in response to operation of the control means.

References Cited by the Examiner

UNITED STATES PATENTS

| | | | |
|---|---|---|---|
| 2,640,572 | 6/1953 | O'Brien | 74—731 |
| 2,697,367 | 12/1954 | Winther | 74—761 |
| 2,717,524 | 9/1955 | Davis | 74—768 X |
| 2,757,558 | 8/1956 | Stoeckicht | 74—792 |
| 2,959,987 | 11/1960 | Miller | 74—792 |
| 2,965,202 | 12/1960 | Christenson. | |
| 2,978,928 | 4/1961 | Tuck et al. | |
| 3,053,116 | 9/1962 | Christenson et al. | |
| 3,058,373 | 10/1962 | Snoy et al. | |
| 3,064,779 | 11/1962 | Christenson. | |
| 3,073,179 | 1/1963 | Christenson. | |
| 3,095,760 | 7/1963 | Christenson et al. | |
| 3,096,666 | 7/1963 | Christenson et al. | |
| 3,125,201 | 3/1964 | Fisher. | |

FOREIGN PATENTS 355,895   9/1931   Great Britain.

DON A. WAITE, *Primary Examiner.*